（12）United States Patent
Choi et al.

(10) Patent No.: US 8,506,137 B2
(45) Date of Patent: Aug. 13, 2013

(54) ADAPTIVE FRONT LIGHTING SYSTEM AND CONTROL METHOD OF THE SAME

(75) Inventors: Sung Uk Choi, Hwaseong-si (KR); Hun Soo Kim, Bucheon-si (KR); Hee Jun Jeong, Hwaseong-si (KR); Se Wook Oh, Gunpo-si (KR); Ki-Young Ahn, Daegu (KR)

(73) Assignees: Hyundai Motor Company, Seoul (KR); SL Lighting Corporation, Daegu (KR)

( * ) Notice: Subject to any disclaimer, the term of this patent is extended or adjusted under 35 U.S.C. 154(b) by 346 days.

(21) Appl. No.: 12/846,665

(22) Filed: Jul. 29, 2010

(65) Prior Publication Data

US 2011/0121733 A1  May 26, 2011

(30) Foreign Application Priority Data

Nov. 20, 2009 (KR) .................. 10-2009-0112539

(51) Int. Cl.
*B60Q 1/00* (2006.01)
(52) U.S. Cl.
USPC ........... 362/466; 362/464; 362/507; 362/526; 362/538; 362/545; 315/82
(58) Field of Classification Search
USPC .................. 362/464–466, 507, 508, 523, 538, 362/543–545, 526; 315/82
See application file for complete search history.

(56) References Cited

U.S. PATENT DOCUMENTS 7,449,997 B2 * 11/2008 Furusawa et al. ............. 340/468
2010/0164382 A1 * 7/2010 Lee et al. ..................... 315/82

FOREIGN PATENT DOCUMENTS

| JP | 2002-326535 A | 11/2002 |
| JP | 2002-326536 A | 11/2002 |
| JP | 2004-98851 A | 4/2004 |
| JP | 2006-182100 A | 7/2006 |
| JP | 2007-106341 A | 4/2007 |
| JP | 2008-1358 A | 1/2008 |
| KR | 10-0501602 B1 | 7/2005 |
| KR | 10-0798143 B1 | 1/2008 |
| KR | 10-2008-0113119 A | 12/2008 |
| KR | 10-2009-0057132 A | 6/2009 |

* cited by examiner

*Primary Examiner* — Stephen F Husar
*Assistant Examiner* — Meghan Dunwiddie
(74) *Attorney, Agent, or Firm* — Morgan, Lewis & Bockius LLP

(57) ABSTRACT

Provided is an Adaptive Front Lighting System and a control method thereof, which includes a motor driver which controls a beam irradiation direction of a headlamp by operating a motor coupled to the headlamp according to a motor control signal, and generates a motor fault signal when fail occurs in the motor, a power supply unit which controls a magnitude of electric power supplied to the headlamp according to a power control signal, and a controller which selectively outputs the power control signal to the power supply unit according to the motor fault signal of the motor driver.

14 Claims, 3 Drawing Sheets

ADAPTIVE FRONT LIGHTING SYSTEM AND CONTROL METHOD OF THE SAME

CROSS-REFERENCE TO RELATED APPLICATION

The present application claims priority to Korean Patent Application No. 10-2009-0112539, filed on Nov. 20, 2009, the entire contents of which is incorporated herein for all purposes by this reference.

BACKGROUND OF THE INVENTION

1. Field of the Invention

The present invention relates to an Adaptive Front Lighting System (AFLS) of a vehicle having a LED lamp, and a control method thereof, more particularly, to an Adaptive Front Lighting System which can prevent the dazzling of a vehicle (opposing vehicle) or a pedestrian that comes from the opposite direction without the driving of motor through reconfiguring a pattern of beam by controlling a power which is supplied to LED lamps when fail is occurred in motor during the dynamic bending operation of headlight.

2. Description of Related Art

Generally, vehicle includes a lighting device for looking at the things of the front in the night driving and an equalization apparatus for informing other vehicle or other road user of the driving state of driving vehicle.

Recently, in order to improve the front perception of a driver and an opposite side driver, the Adaptive Front Lighting System (AFLS) is introduced and used.

This Adaptive Front Lighting System is a system which not only irradiates the beam of the automotive headlight into the front but selectively can change the width and the length of the headlight beam according to the driving condition and road condition of vehicle.

That is, the Adaptive Front Lighting System changes the beam pattern according to the road conditions and the vehicle movement so that the light can be continuously irradiated into the road of the front at which driver should gaze steadily regardless of turning of vehicle or driving of a slope way such that it makes it possible for a driver to rapidly and accurately recognize obstacles or other problems on the front road.

To this end, after sensing the steering angle of steering wheel for vehicle, the speed of vehicle, and other driving condition of vehicle by a sensor, the Adaptive Front Lighting System runs an actuator according to the sensing result to change the scan direction of headlight into the up down left right (dynamic bending).

However, in this Adaptive Front Lighting System, in case that failure occurs in the actuator when performing the dynamic bending function in a specific action mode (high beam, basic beam, town beam, motor way), the state where headlight is deflected to a particular direction (e.g., left direction) can be continuously maintained.

If then, when vehicle travels a straight road, the headlight of vehicle faces the opposite side vehicle or pedestrians, so that it has a problem that it causes to dazzle the eye of driver of opposing vehicle or pedestrian.

As a typical fail-safe method for resolving such problem as shown in FIG. 1, a method for preventing the dazzling of the opposing vehicle by downwardly directing the beam of headlight compulsively using a leveling actuator is developed.

However, in this case, another problem that it is difficult for a driver to see well at nighttime driving due to the excessive downward irradiance of beam is occurred.

Moreover, in case that failure occurs in such leveling actuator, even the above described method cannot be used.

Furthermore, separate control equipments and parts for controlling the leveling actuator are required due to the use of the motor like the leveling actuator with the generation of electromagnetic waves.

Accordingly, it has a disadvantage that the manufacturing cost increased, as the configuration of the Adaptive Front Lighting System becomes complicated and the number of parts is increased so that the processing step is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to improve the function of Adaptive Front Lighting System and can perform a fail-safe function when a fail is occurred in an AFLS (Adaptive Front Lighting System) motor during the dynamic bending function operation.

In accordance with an aspect of the present invention, the adaptive front lighting system, may include a motor driver which controls a beam irradiation direction of a headlamp by operating a motor coupled to the headlamp according to a motor control signal, and generates a motor fault signal when fail occurs in the motor, a power supply unit which controls a magnitude of electric power supplied to the headlamp according to a power control signal, and a controller which selectively outputs the power control signal to the power supply unit according to the motor fault signal of the motor driver.

The controller may output the power control signal when the motor fault signal is generated from the motor driver and an extent of deflection of the headlamp deviates from a predetermined range in a dynamic bending mode.

The controller may compare a current beam irradiation direction of the headlamp in a state that the motor fault signal is generated from the motor driver with a previous beam irradiation direction of the headlamp in a predetermined time period to determine the extent of deflection of the headlamp, wherein the predetermined time period is determined by a driving condition of a vehicle and a road condition The headlamp may include a plurality of LED lamps for a front lighting of a vehicle.

The controller may output the power control signal when the motor fault signal is generated from the motor driver and an extent of deflection of at least an LED lamp deviates from a predetermined range in a dynamic bending mode.

The power supply unit may control a magnitude of an electric power supplied to the at least an LED lamp among the plurality of LED lamps according to the power control signal.

The power supply unit may block an electric power supplied to the at least an LED lamp among the plurality of LED lamps according to the power control signal.

The adaptive front lighting system may further include a sensing unit which senses a driving status of a vehicle, wherein the controller generates the motor control signal according to a sensing signal from the sensing unit and the motor fault signal.

The motor fault signal may include a direction to which the headlight faces and the extent of deflection thereof.

In another aspect of the present invention, a method of controlling an adaptive front lighting may include a) sensing a motor fault signal of a motor coupled to a headlamp in a dynamic bending mode of controlling a beam irradiation direction of the headlamp, and b) selectively controlling a magnitude of electric power supplied to the headlamp when the motor fault signal of the motor is sensed, wherein sensing change of a driving direction of a vehicle before the steps of a) or b), determining a direction to which the headlight faces and an extent of deflection of the headlamp when the driving direction of the vehicle is changed, and performing the step b) when the motor fault signal of the motor is sensed and the beam irradiation direction of the headlight is determined to be moved to a direction beyond a predetermined range after the step a).

Determining the direction to which the headlight faces and the extent of deflection of the headlamp, may include comparing a current beam irradiation direction of the headlight with a previous beam irradiation direction thereof in a predetermined time period, wherein the predetermined time period is determined by a driving condition of the vehicle and a road condition.

Selectively controlling the magnitude of the electric power may include determining a direction to which each LED lamp of the headlamp faces and an extent of deflection thereof, and controlling a magnitude of an electric power supplied to at least an LED lamp of the headlamp, when extent of deflection of the at least an LED lamp deviates from the predetermined range, wherein the headlamp includes a plurality of LED lamps of the headlamp.

Selectively controlling the magnitude of electric power may include determining a direction to which each LED lamp of the headlamp faces and an extent of deflection thereof, and blocking an electric power supplied to at least an LED lamp, when extent of deflection of the at least one LED lamp deviates from the predetermined range, wherein the headlamp includes a plurality of LED lamps of the headlamp.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
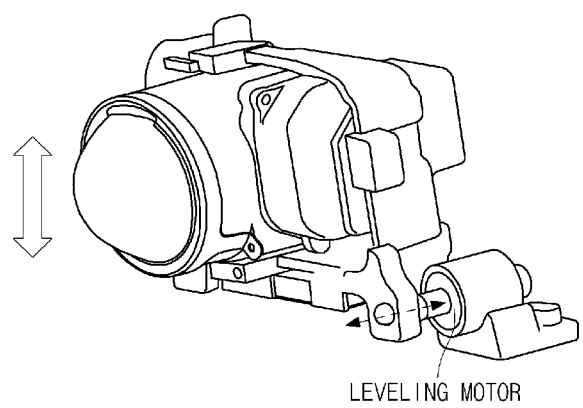
FIG. 1 illustrates a conventional fail-safe method for compulsively downwardly directing a headlight by using a leveling motor.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
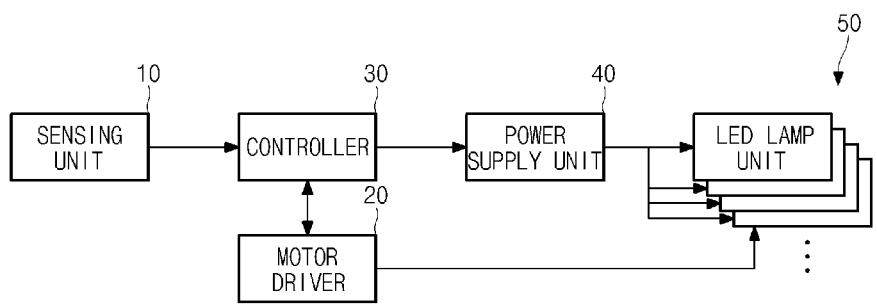
FIG. 2 illustrates a configuration of an exemplary Adaptive Front Lighting System AFLS according to the present invention.

FIG. 2 illustrates a configuration of Adaptive Front Lighting System (AFLS) according to an exemplary embodiment of the present invention.

The Adaptive Front Lighting System in an exemplary embodiment of the present invention, includes a sensing unit 10, a motor driver 20, a controller 30, a power supply unit 40 and a LED lamp unit 50.

The sensing unit 10 senses a driving status of vehicle such as a driving condition of vehicle, and a road condition by using a plurality of sensors, and outputs a sensing signal which indicates the sensing result to the controller 20.

For instance, the sensing unit 10 includes various sensors which are mounted on vehicle such as an inclination sensor, a steering wheel angle sensor, a speed sensor, and a road winding sensor.

After sensing the angle of inclination of the driving road, the steering angle of the steering wheel, the speed of vehicle, the winding state of the road by utilizing such sensors, the sensing unit 10 outputs the sensing result to the controller 20.

According to a motor control signal of the controller 30, the motor driver 20 operates an AFLS motor (not shown) so that the LED lamp units 50 of the vehicle headlamp irradiate beam to be deflected from side to side.

And while monitoring the operation of the AFLS motor, the motor driver 20 generates a motor fault signal when fail occurs in the AFLS motor and outputs it to the controller 30.

The controller 30 controls the overall operation of the adaptive headlight system.

According to the sensing signal from the sensing unit 10 and the motor fault signal from the motor driver 20, the controller 30 generates a motor control signal and a power control signal to output to the motor driver 20 and the power supply unit 40 respectively.

At this time, the motor control signal is a signal for controlling the operation of the motor, the power control signal is a signal for selectively turning each LED lamp of the LED lamp unit 50 off.

If the motor fault signal is received from the motor driver 20, the controller 30 determines the current beam irradiation direction of the vehicle headlamp by using the information included in the motor fault signal.

In case the vehicle headlamp is deflected to be deviated from a predetermined range as a result of the determination, the controller 30 generates a power control signal and configures a beam pattern for fail-safe.

In an exemplary embodiment of the present invention, the controller 30 may compare the previous beam irradiation direction with the current beam irradiation direction in a predetermined time period to decide whether the vehicle headlamp is deviated from a predetermined range or not. The predetermined time period may be determined by a driving condition of a vehicle and/or the road condition such as the vehicle speed, a driving direction, and a winding degree of the vehicle.

Through this beam pattern configuration, the controller 30 performs a failsafe operation that prevents the dazzling of the driver of opposing vehicle or pedestrians without the operation of the motor.

According to the power control signal from the controller 30, the power supply unit 40 controls the magnitude of the power supplied to each LED lamp of the LED lamp unit 50.

The LED lamp unit 50 includes a plurality of LED lamps installed in headlight for the front lighting of the vehicle. The LED lamp unit 50 is turned on according to the power supplied from the power supply unit 40 to irradiate beam, and the scan direction of beam is dynamically controlled according to the operation of the AFLS motor.

The operation of the AFLS having the above-described configuration is briefly illustrated.

The Adaptive Front Lighting System is initialized if driver starts up vehicle. Then, the controller 30 checks whether the revolution per minute (RPM) of vehicle reached a predetermined level (e.g., 500 RPM).

If the RPM of vehicle reaches the given level, the controller 30 processes sensing signals received from the sensing unit 10 and determine the operation mode of the headlight which is suitable for the driving speed of vehicle.

For example, in case vehicle travels with a speed ranging from 30 Km per hour to 90 Km per hour, the controller 30 controls the motor driver 20 so that headlight irradiates beam in a basic beam (CLASS C) mode.

In case the speed of vehicle is 30 Km per hour or less and such speed is continued over a given time (2 seconds) while the surrounding illumination is a given level (12 Lx) or greater, the controller 30 controls the motor driver 20 so that headlight irradiates beam in a town beam (CLASS V) mode.

Moreover, in case the speed of vehicle is 90 Km per hour or greater and such speed is continued over a given time (2 seconds), the controller 30 controls the motor driver 20 so that headlight irradiates beam in a motor way (CLASS E) mode.

If the driving direction of vehicle is changed during when the headlight of vehicle is set up as a specific mode and irradiates beam, e.g., vehicle corners, the controller 30 obtains information of driving status of the vehicle (driving direction, steering angle of steering wheel) through the sensing unit 10 and generates a corresponding motor control signal and outputs it to the motor driver 20.

According to the motor control signal from the controller 30, the motor driver 20 moves the beam irradiation direction of headlight from side to side by operating the AFLS motor so that headlight lightens the road in the direction to which vehicle travels.

But, in the state where the beam irradiation direction of headlight is moved to a specific direction, if fail is generated in the AFLS motor, the motor driver 20 senses such fail occurrence to output the motor fault signal to the controller 30.

At this time, the motor fault signal may include information of the direction to which headlight faces and the extent of deflection.

The controller 30 receiving the motor fault signal outputs a power control signal for blocking the power supply to a specific LED lamp according to the direction to which headlight irradiates beam and the angle of deviation, to the power supply unit 40.

Figure 3:
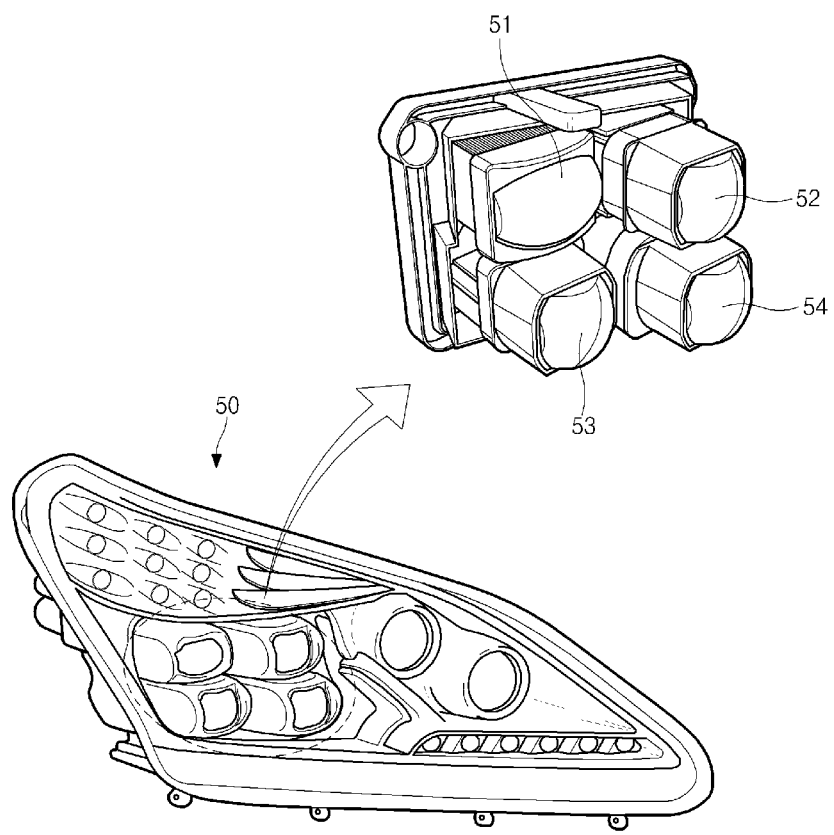
FIG. 3 illustrates an exemplary headlight including a LED lamp according to the present invention.

For example, FIG. 3 is a drawing illustrating an exemplary embodiment of a headlight including a LED lamp. In case headlight irradiates beam to the opposite side lane, the controller 30 outputs a power control signal which indicates to turn off a specific LED lamp 54 irradiating beam to the opposite side lane among four LED lamps 51 to 54 for the front lighting, to the power supply unit 40.

And then, according to the power control signal, the power supply unit 40 makes beam not to be irradiated to the opposing vehicle by stopping the electric power supply for a corresponding LED lamp 54.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

For example, when LED lamps are deflected to a specific direction, the selective turnoff of LED can be changed according to the configuration (e.g., the number and location of LED lamps) of the LED lamp unit 50 and the operating logic of an adaptive headlight system.

And in case a motor fault signal is generated but headlight is not deflected, or in case deflection is within a preset range so that it does not affect to opposing vehicle or pedestrian, the power control signal may not be generated. That is, the controller 30 can selectively generate a power control signal according to the deflection of headlight.

Moreover, in the above-described embodiment, it was illustrated that a specific LED lamp is turned off according to the power control signal, but the brightness can be controlled not by turning a corresponding LED lamp off. For example, the controller 30 can control the brightness of a corresponding lamp by outputting a power control signal controlling the magnitude of the power supplied to the specific LED lamp according to the deflection of headlight to the power supply unit 40.

What is claimed is:

1. An adaptive front lighting system, comprising:
  a motor driver which controls a beam irradiation direction of a headlamp which includes a plurality of LED lamps, by operating a motor coupled to the headlamp according to a motor control signal, and generates a motor fault signal when fail occurs in the motor;
  a controller which selectively outputs a power control signal to turn off at least an LED lamp irradiating beam to a direction according to the motor fault signal of the motor driver; and
  a power supply unit which blocks an electric power supplied to the at least an LED lamp according to the power control signal.

2. The adaptive front lighting system of claim 1, wherein the controller outputs the power control signal when the motor fault signal is generated from the motor driver and an extent of deflection of the headlamp deviates from a predetermined range in a dynamic bending mode.

3. The adaptive front lighting system of claim 2, wherein the controller compares a current beam irradiation direction of the headlamp in a state that the motor fault signal is generated from the motor driver with a previous beam irradiation direction of the headlamp in a predetermined time period to determine the extent of deflection of the headlamp.

4. The adaptive front lighting system of claim 3, wherein the predetermined time period is determined by a driving condition of a vehicle and a road condition.

5. The adaptive front lighting system of claim 1, wherein the controller outputs the power control signal when the motor fault signal is generated from the motor driver and an extent of deflection of the at least an LED lamp deviates from a predetermined range in a dynamic bending mode.

6. The adaptive front lighting system of claim 5, wherein the power supply unit controls a magnitude of an electric power supplied to the at least an LED lamp among the plurality of LED lamps according to the power control signal.

7. The adaptive front lighting system of claim 1, further comprising a sensing unit which senses a driving status of a vehicle, wherein the controller generates the motor control signal according to a sensing signal from the sensing unit and the motor fault signal.

8. The adaptive front lighting system of claim 1, wherein the motor fault signal includes a direction to which the headlight faces and the extent of deflection thereof.

9. A method of controlling an adaptive front lighting, the method comprising:
  a) sensing a motor fault signal of a motor coupled to a headlamp which includes a plurality of LED lamps in a dynamic bending mode of controlling a beam irradiation direction of the headlamp; and
  b) selectively controlling turn-off of at least an LED lamp according to a power control signal.

10. The method of claim 9, wherein
  sensing change of a driving direction of a vehicle before the steps of a) or b);
  determining a direction to which the headlight faces and an extent of deflection of the headlamp when the driving direction of the vehicle is changed; and
  performing the step b) when the motor fault signal of the motor is sensed and the beam irradiation direction of the headlight is determined to be moved to a direction beyond a predetermined range after the step a).

11. The method of claim 10, wherein determining the direction to which the headlight faces and the extent of deflection of the headlamp, includes comparing a current beam irradiation direction of the headlight with a previous beam irradiation direction thereof in a predetermined time period.

12. The method of claim 11, wherein the predetermined time period is determined by a driving condition of the vehicle and a road condition.

13. The method of claim 9, wherein selectively controlling turn-off of the at least an LED lamp according to the power control signal comprises:
  determining a direction to which each LED lamp of the headlamp faces and an extent of deflection thereof; and
  controlling a magnitude of an electric power supplied to the at least an LED lamp of the headlamp, when extent of deflection of the at least an LED lamp deviates from the predetermined range.

14. The method of claim 9, wherein selectively controlling turn-off of the at least an LED lamp according to the power control signal comprises:
  determining a direction to which each LED lamp of the headlamp faces and an extent of deflection thereof; and
  blocking an electric power supplied to the at least an LED lamp, when extent of deflection of the at least an LED lamp deviates from the predetermined range.

* * * * *